Jan. 13, 1959  H. KÖLBEL ET AL  2,868,627
APPARATUS FOR CARBON MONOXIDE HYDROGENATION
Filed Sept. 21, 1954

INVENTORS.
HERBERT KÖLBEL
PAUL ACKERMANN
BY
their ATTORNEY

United States Patent Office 2,868,627
Patented Jan. 13, 1959

2,868,627

APPARATUS FOR CARBON MONOXIDE HYDROGENATION

Herbert Kölbel and Paul Ackermann, Moers, Germany

Application September 21, 1954, Serial No. 460,999

8 Claims. (Cl. 23—288)

The present invention relates to the design or form of the sump below the shaft conduits and to the gas feed inlet of the cylindrical tower reaction apparatus as described in German Patent R 10,008 IV$b$/12$g$, in which the whole cross section of the cylinder tower is divided into a plurality or bundle of shaft conduits and is used in this modified form catalytic carbon monoxide hydrogenation with a finely divided catalyst suspended in a liquid medium.

The subdivision of the total length of the tower, including the upper gas space, into single columns for standing, that is non-circulating liquid, is accomplished by shaft conduits with a diameter of not more than 30 centimeters and of a length 100 centimeters or longer, the subdivision into several single columns being such that they all have a common sump and common upper gas space, according to German Patent R 10,008 IV$b$/12$g$, and as described in our copending application Serial No. 481,468 filed January 12, 1955 with the formation of mainly vertically directed liquid recycle streams and with the result that gas distribution according to quantity and upward gas velocity of gas bubbles is largely equalized almost below a gas rate of 30 liters, at operating conditions, per hour, per centimeter square of reaction space cross section over the total cross section of the reaction space. Therefore, it has been found expedient to use separately each single shaft column, through which the liquid column is formed, and if possible a separately controlled gas rate, which is fed each time into the single shaft conduits, or at least vertically underneath the shaft conduits into the common liquid sump. From this came the necessity for a gas feed divided uniformly over the total cross section of the lower reaction space with at least one gas exit opening per shaft conduit. It has now been found that a uniform gas distribution can be obtained for such reaction vessels containing a plurality of high, cylindrical shaft conduits by having these shaft conduits terminate above the inlet to leave a lower reaction space of a diameter the same as the portion of the cylinder around the shaft conduits, with tapering of the bottom of the lower reaction space below the shaft conduits into a single, axially entering gas entrance opening, where its distance from the lower end of the shaft conduits is at least as long or longer than the diameter of the cylindrical reaction space across the shaft conduits and the lower reaction space.

The effect of an arrangement according to the invention is particularly surprising for cylindrical liquid columns of 30 centimeters' diameter and even larger where, with gas feed in small bubbles uniformly distributed over the whole floor of the liquid, since cylinders usually prevent a uniform distribution of the gas bubbles over the cross section at every height except in the neighborhood of the liquid surface. This internal liquid circulation is promoted presumably by central gas feed. It was found thereby that with shaft conduit division of the liquid column the upper inversion point of the liquid cylinder is not below the lower ends of the shaft conduits. Here then the gas distribution is almost uniform over the whole cross section similar to the liquid surface. The regulating effect of the suspension of liquid and gas bubbles formed in the shaft columns on the hydrostatic equilibrium at the bases of the shaft conduits packet causes in addition a practically uniform gas distribution to all shaft columns of the conduits.

The form of the taper of the lower reaction space below the shaft conduits according to the invention can be formed in different ways, for example, conically or convex or the like, as is shown in Figures 1 and 2.

Figure 1:
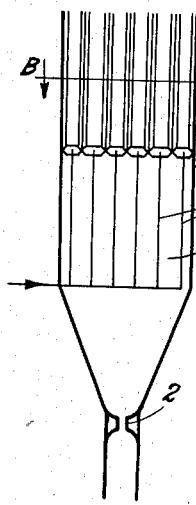
Figs. 1 to 5 are taken on line A—A of Fig. 6, to show modifications according to the present invention of the lowermost portion of the reactor, as shown in greater detail in Figs. 7$a$ and 7$b$ of our copending application Serial No. 481,468, filed January 12, 1955, for Apparatus for Carrying Out Gaseous Catalytic Reactions in Liquid.

Referring in general to Fig. 4, the cylindrical reactor 1 is conically narrowed at its lower end and has at the bottom a central gas inlet 2. The outlet 3 for the product gas is at the top of the cylinder 1. The reaction space intermediate the top and bottom of the cylinder 1 is subdivided by shaft conduits 4 containing pipes 7 for heat exchange which have their outlet also at the top of the cylinder 1. The pipe 10 serves for emptying and filling the reactor with catalyst suspension, and the gas is fed in through the gas inlet 2.

It is appropriate to employ a distance 6 between gas feed inlet 2 and the lower ends 5 of the shaft packet 4 of such length, namely as large or several times as large as the diameter of the reactor 1, that the gas stream is sufficiently dispersed. Also, deflection surfaces can be installed over the gas feed inlet 2. However, the horizontal cooling liquid feed pipes 4 act as such surfaces to a sufficient extent. These are extended appropriately as low as possible below the shaft packet 4, since the heat of reaction also must be drawn off in the sump 6 below the shaft packet.

The ratio of the free cross sectional area of the gas feed inlet nozzle 2 and the reaction space, in the height of the cylinder, may lie in the reactor of this invention between 1 and 10 and about 1 and 10,000, depending on the absolute size of the reactor 1 and the thruput per unit area in units of volume of synthesis gas relative to the free reaction space cross section. The practical cross sectional thruput for carbon monoxide hydrogenation with suspended iron catalysts at synthesis pressures between about 5 and 25 atmospheres is preferably in the range of 5 and 200 liters synthesis gas per hour and per square centimeter of reaction space cross section under operating conditions.

The ratio of nozzle 2 cross section to reaction space cross section B—B is chosen for the total range of the cross sectional thruput in such a manner that the linear velocity in the gas feed inlet opening 2 is between 2 and 400 meters per second, preferably 5 and 200 meters per second. It is advantageous to choose, for larger reaction space diameters, a relatively smaller nozzle cross section, whereby the linear gas velocity correspondingly is increased also with equal thruput of synthesis gas per cross section. Because the distance between nozzle 2 and lower ends 5 of the shaft packet is increased, according to the invention, corresponding to the diameter of the reaction space, a correspondingly increased gas velocity is also desired, since in the sump 6, which may be up to 5 meters high, a vigorous turbulence of the liquid is to be established.

Reaction spaces of large diameter are also advantageously kept larger in height, for example, 25 meters' height at 2.5 meters' diameter. In order to obtain the same space velocity with synthesis gas and consequently the same space time yield of reaction products, such high reactors can be operated with higher cross sectional thruput than lower reactors without increasing the catalyst load at the same concentration. By increasing the cross sectional thruput one is able to distribute the zone of reaction, which, for example, for a cross sectional thruput of 10 operational liters per hour is only about 2 meters uniformly over the total height of the reaction space. An increase in temperature from bottom to top with relatively low temperature in the oven sump 6, which can be obtained, for example, according to the German Patent R 11,327 IV d/120, is advantageous in the same sense.

The suspended catalyst is uniformly distributed over the total sump 6 volume by the strong circulation of the liquid medium, which occurs according to the invention in the entire sump volume, so that also a uniform feed of catalyst is assured to the single shafts of the conduits 4. Especially stagnant spaces, lacking motion, are avoided by the tapering of the bottom of the lower reaction space part of the column 1 according to the invention and thereby catalyst deposition is avoided.

Figure 2:
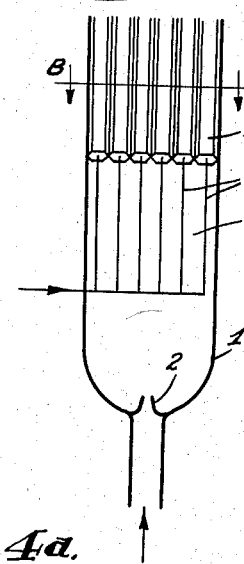

In place of the conical taper as in Figure 1, it is also possible to use advantageously a taper, fitted to the liquid circulation movement, of the type shown in Figure 2, where, by the lengthening of the nozzle 2 so that it extends into the lower reaction space 6, the circulating movement can be effectively assisted.

Figure 3:
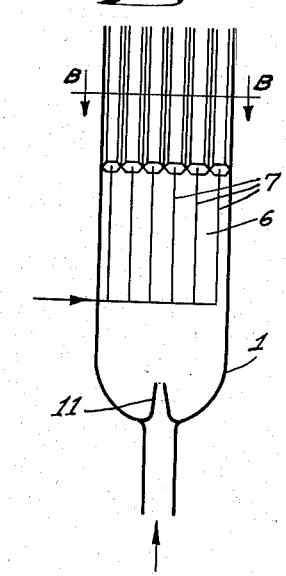
Figure 4A:
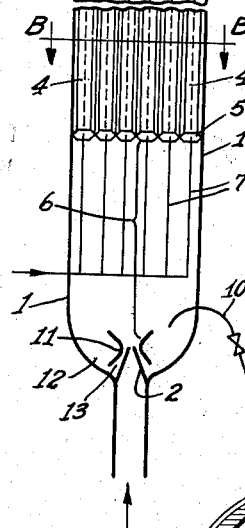
Figure 4B:
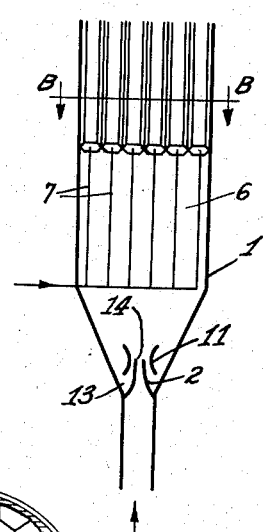

One also may employ, in addition to the nozzle 2 which is extended into the lower reaction space 6, concentric guiding vanes 11, perhaps in the manner shown in Figure 3 or Figure 4a or 4b. The guiding vane 11 is arranged advantageously so that between it and the inside wall 12 of the lower part of the reaction vessel there is formed a free annular space 13 for the liquid medium, which narrows toward the top and has the largest contraction at about the upper edge 14 of the gas feed tube.

Figure 5:
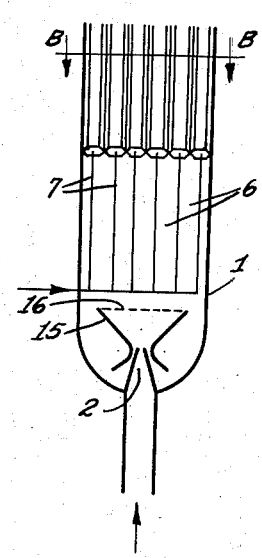
Figure 6:
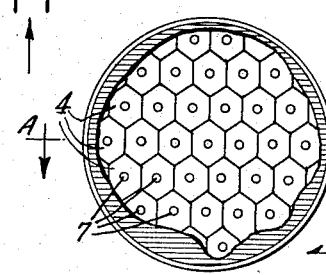
Fig. 6 is a horizontal section on the line B—B of Figs. 1 to 5.

From this point on the guiding vane may be provided with an attachment 15, which expands upwardly like a venturi, as for example, according to Figures 4a, 4b, and 5, where the opening angle is advantageously between 50° and 120°.

A strong suction or aspirating effect is exerted by the gas stream with this arrangement, whereby the liquid is circulated with increased velocity. Thereby one effects a forced circulation of the catalyst suspension, which can be largely regulated. Since the energy necessary is brought into the system almost exclusively by the synthesis gas, one is able to increase the velocity of the liquid circulation to such an extent, by increasing the gas velocity whereby a pressure drop before and behind the nozzle of 0.2–1 atm. or more takes place, that a considerable part of the gas that is mixed above the nozzle 2 with the liquid is carried past the nozzle with the liquid in circulation. The effect of this is an already almost uniform division of the gas into little bubbles in the zone below the shafts of the conduits in the vessel 1.

The gas distribution according to the invention may be still further improved according ot Figure 5 by providing the venturi extension 15 of the guiding vane at the top with a perforated plate 16, through whose opening the gas and the circulating liquid are pressed together. The holes of the perforated plate may be kept relatively large, they can have preferably more than 10 millimeters' diameter and circular cross section. They can be divided uniformly over the whole plate or they may be concentrated towards the rim. The sum of the cross sections of all the holes shall be, however, at least 2 and up to 20 times as large as the sum of the smallest free cross section of the gas feed nozzle 2 and the annular space 13 between it and the guiding vane.

We claim:
1. A reactor for the hydrogenation of carbon monoxide by a catalyst suspended in a liquid medium, comprising: an upright cylinder; a plurality of shaft conduits mounted in said cylinder to extend upright axially thereof and adapted to contain said catalyst in the liquid medium; a gas inlet to the interior of the cylinder at a level below the bottoms of the shaft conduits; said shaft conduits having their lower ends terminate in said cylinder at a distance above the gas inlet thereto so as to have the gas inlet spaced from the lower ends of said shaft conduits a distance at least as great as the diameter of the cylinder around the shaft conduits and leave a lower reaction space between said lower ends of the shaft conduits and the gas inlet of the same diameter as the portion of the cylinder around the shaft conduits; and the bottom of said lower reaction space being tapered to said gas inlet and said gas inlet also being tapered to provide a single axially directed stream of gas into said lower reaction space, whereby said stream induces circulation within said lower reaction space to feed gas into said shaft conduits uniformly.

2. Reactor according to claim 1, wherein the tapered gas inlet has a cross-sectional area such that the ratio of the free cross-sectional area of the gas inlet to the reaction space, in the height of the cylinder, falls between 1 and 10 and 1 and 10,000, and the inlet discharges gas at a velocity of 2 to 400 meters per second with a cross-sectional throughput of 5 to 200 operational liters of gas per hour per square centimeter of reaction space.

3. Reactor according to claim 2, wherein the gas inlet is extended into the lower reaction space.

4. Reactor according to claim 3, wherein a ring-shaped venturi guiding vane is concentrically mounted above said gas inlet and extends into the lower reaction space with a free space between the guiding vane and the inside wall of said lower reaction space and with an annular free space between the interior of said vane and the gas inlet for circulation of said liquid medium by said gas.

5. Reactor according to claim 4, wherein the guiding vane is provided at its upper edge with an opening angle of at least 50° and up to about 120°.

6. Reactor according to claim 5, wherein the guiding vane is provided at its upper edge with a perforated plate whose openings together have a cross-section 2 to 20 times as large as the sum of the smallest free cross-section of the gas inlet and the annular space between the gas inlet and the guiding vane.

7. Reactor according to claim 1, wherein the ratio of the free cross-sectional area of the gas inlet to the reaction space, in the height of the cylinder, is between 1 and 10 and 1 and 10,000, and a linear gas velocity of 5 to 200 meters per second is available at said gas inlet with a cross-sectional throughput of 5 to 200 operational liters gas per hour per square centimeter of reaction space.

8. Reactor according to claim 1, wherein the lower reaction space below the lower ends of said shaft conduit is tapered to said single, axially placed, gas inlet whose distance from the lower ends of the shaft conduits is larger than the diameter of the cylindrical reaction space.

References Cited in the file of this patent
UNITED STATES PATENTS

| | | |
|---|---|---|
| 2,289,953 | Aldridge | July 14, 1942 |
| 2,343,560 | Klein et al. | Mar. 7, 1944 |
| 2,620,262 | Hujsak et al. | Dec. 2, 1952 |

FOREIGN PATENTS

| | | |
|---|---|---|
| 467,759 | Canada | Aug. 29, 1950 |